(12) United States Patent
Zaitsu

(10) Patent No.: US 10,757,279 B2
(45) Date of Patent: Aug. 25, 2020

(54) SHEET STACKER AND IMAGE FORMING APPARATUS

(71) Applicant: Daikai Zaitsu, Kanagawa (JP)

(72) Inventor: Daikai Zaitsu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/139,485

(22) Filed: Sep. 24, 2018

(65) Prior Publication Data

US 2019/0166260 A1    May 30, 2019

(30) Foreign Application Priority Data

Nov. 24, 2017   (JP) .................................. 2017-225783

(51) Int. Cl.
| | |
|---|---|
| *H04N 1/00* | (2006.01) |
| *B65H 1/04* | (2006.01) |
| *B65H 3/06* | (2006.01) |
| *B65H 31/26* | (2006.01) |
| *B65H 1/26* | (2006.01) |

(52) U.S. Cl.
CPC ............ *H04N 1/0066* (2013.01); *B65H 1/04* (2013.01); *B65H 1/266* (2013.01); *B65H 3/0661* (2013.01); *B65H 31/26* (2013.01); *B65H 2402/5151* (2013.01); *B65H 2402/64* (2013.01); *B65H 2511/11* (2013.01); *B65H 2511/20* (2013.01)

(58) Field of Classification Search
CPC .................................................... H04N 1/0066
USPC ........................................................ 358/498
See application file for complete search history.

(56) References Cited

U.S. PATENT DOCUMENTS

| | | | | |
|---|---|---|---|---|
| 6,116,591 A | * | 9/2000 | Kim .......................... | B65H 1/04 271/171 |
| 6,338,585 B1 | * | 1/2002 | Amano .................. | B65H 1/266 399/393 |
| 7,258,338 B2 | * | 8/2007 | Lee .......................... | B65H 1/266 271/171 |
| 9,126,782 B2 | * | 9/2015 | Abe .......................... | B65H 1/08 |
| 2009/0206545 A1 | * | 8/2009 | Sunohara ............... | B65H 1/266 271/171 |
| 2015/0102552 A1 | * | 4/2015 | Doshida .................... | B65H 1/04 271/171 |
| 2016/0052739 A1 | * | 2/2016 | Hayashi .................... | B65H 1/04 271/248 |
| 2017/0255155 A1 | | 9/2017 | Enomoto et al. | |
| 2018/0179000 A1 | * | 6/2018 | Morisawa ................ | B65H 1/12 |

FOREIGN PATENT DOCUMENTS

| | | |
|---|---|---|
| JP | 2000-007162 | 1/2000 |
| JP | 2005-231862 | 9/2005 |
| JP | 2015-229536 | 12/2015 |

\* cited by examiner

*Primary Examiner* — Jacky X Zheng
(74) *Attorney, Agent, or Firm* — Harness, Dickey & Pierce, P.L.C.

(57) ABSTRACT

A sheet stacker includes a sheet adjuster movable to regulate a position of a sheet in the sheet stacker, an operation portion to release the sheet adjuster when the operation portion moves in a predetermined direction, and a lock movable together with the sheet adjuster and the operation portion to regulate a movement of the operation portion in the predetermined direction.

15 Claims, 5 Drawing Sheets

SHEET STACKER AND IMAGE FORMING APPARATUS

CROSS-REFERENCE TO RELATED APPLICATION

This patent application is based on and claims priority pursuant to 35 U.S.C. § 119 to Japanese Patent Application No. 2017-225783, filed on Nov. 24, 2017 in the Japanese Patent Office, the entire disclosure of which is hereby incorporated by reference herein.

BACKGROUND

Technical Field

This disclosure relates to a sheet stacker such as a sheet tray in which sheets such as paper sheets are stacked and an image forming apparatus such as a copier, a printer, a facsimile machine, or a multifunction peripheral having at least two of the copier, printer, and facsimile machine functions and incorporating the sheet stacker.

Related Art

A known sheet stacker such as a sheet tray included in an image forming apparatus such as a copier or a printer includes a sheet adjuster such as a fence to set a position in the width direction and the conveying direction of stacked sheets.

SUMMARY

This specification describes an improved sheet stacker that includes a sheet adjuster movable to regulate a position of a sheet in the sheet stacker, an operation portion to release the sheet adjuster when the operation portion moves in a predetermined direction, and a lock movable together with the sheet adjuster and the operation portion to regulate a movement of the operation portion in the predetermined direction.

This specification further describes an improved image forming apparatus incorporating the sheet stacker described above.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
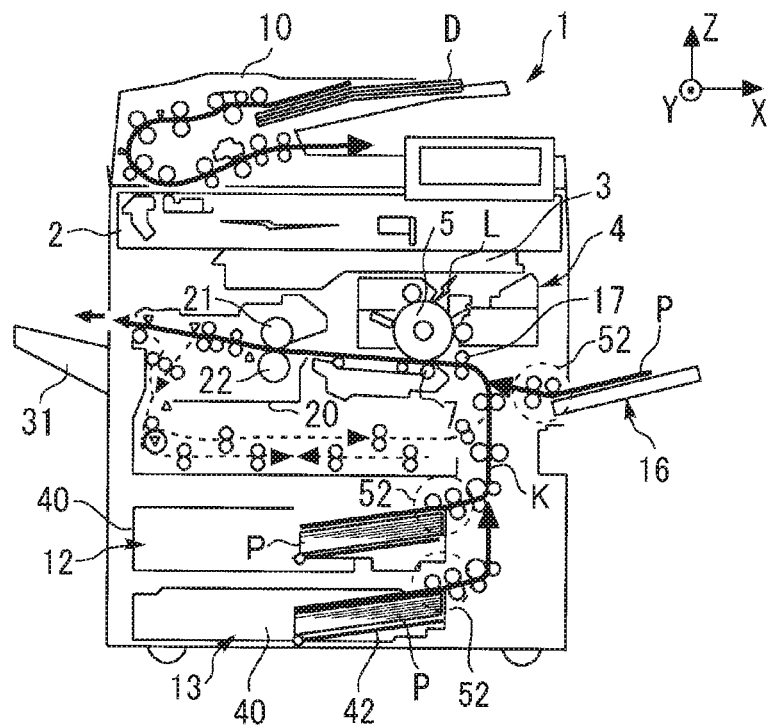
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings illustrating the following embodiments, the same reference codes are allocated to elements (members or components) having the same function or shape and redundant descriptions thereof are omitted below.

With reference to FIG. 1, an overall configuration and operation of an image forming apparatus 1 is described below.

In FIG. 1, the image forming apparatus 1, in this case a copier, includes a scanner 2, an exposure device 3, an image forming device 4, a transfer device 7, a document conveying device 10 such as an automatic document feeder, a sheet feeding device 12, a sheet feeding device 13, a manual sheet feeding device 16, a pair of registration rollers 17, a fixing device 20, a sheet output tray 31, a sheet stacker 40 and a sheet feeding mechanism 52. The scanner 2 optically reads image data of an original document D. The exposure device 3 emits exposure light L based on image data read by the scanner 2 to irradiate the surface of the photoconductor drum 5. The image forming device 4 forms a toner image on the photoconductor drum 5. The transfer device 7 transfers the toner image formed on the surface of the photoconductor drum 5 onto a sheet P. The document conveying device 10 conveys the document D set on a document tray to the scanner 2. The sheet feeding device 12 and the sheet feeding device 13 feed a sheet P accommodated in the sheet stacker 40. The manual sheet feeding device 16 feeds the sheet P which a user sets manually. The pair of registration rollers 17 conveys the sheet P to the transfer device 7. The fixing device 20 includes a fixing roller 21 and a pressing roller 22 and fixes the toner image transferred onto the sheet P on the sheet P. The sheet P ejected from the image forming apparatus body is stacked on the sheet output tray 31. The sheet stacker 40 such as a sheet tray is a sheet stacker in each of the sheet feeding devices 12 and 13. The sheet feeding mechanism 52 is in each of the sheet feeding devices 12, 13, and 16.

A standard image forming operation of the image forming apparatus 1 illustrated in FIG. 1 is described below.

The original document D is fed from the document tray by conveyance rollers of the document conveying device 10 and passes over the scanner 2. The scanner 2 optically reads the image data on the document D passing over the scanner 2.

The optical image data read by the scanner 2 is converted to electrical signals that are transmitted to the exposure device 3. Then, the exposure device 3 emits exposure light L such as the laser light based on the image data of the electrical signals toward the surface of the photoconductor drum 5 of the image forming device 4.

In the image forming device 4, the photoconductor drum 5 rotates clockwise in FIG. 1, and a toner image according to the image data is formed on the photoconductor drum 5 through predetermined image forming processes such as charging, exposure, and developing processes.

Thereafter, the transfer device 7 transfers the toner image formed on the photoconductor drum 5 onto the sheet P conveyed by the pair of registration rollers 17.

By contrast, the sheet P that is conveyed to the transfer device 7 is handled as described below.

Initially, one of the sheet feeding devices 12 and 13 in the image forming apparatus 1 is selected automatically or manually. For example, the lower sheet feeding device 13 is selected. Then, the sheet feeding mechanism 52 feeds and conveys the uppermost one of the sheets P stored in the sheet stacker 40 of the sheet feeding device 13 toward a sheet conveyance path K. Thereafter, the sheet P passes through the sheet conveyance path K in which multiple sheet conveying rollers are disposed and reaches the pair of registration rollers 17.

When the user selects the manual sheet feeding device 16 disposed at one side of the image forming apparatus body, the sheet P set on a manual sheet feeding tray of the manual sheet feeding device 16 by the user (the uppermost sheet p when a plurality of sheets are set on the manual sheet feeding tray) is fed toward the sheet conveyance path K by the sheet feeding mechanism 52 and reaches the pair of registration rollers 17.

The pair of registration rollers 17 aligns and conveys the sheet P toward the transfer device 7 when the image formed on the photoconductor drum 5 meets the sheet P.

After completion of the transfer process, the sheet P passes the transfer device 7 and reaches the fixing device 20 via the sheet conveyance path K. In the fixing device 20, the sheet P is conveyed between the fixing roller 21 and the pressing roller 22, so that the toner image is fixed on the sheet P by heat applied by the fixing roller 21 and pressure applied by the fixing roller 21 and the pressing roller 22, which is a fixing process. The sheet P with the toner fixed thereto after the fixing process passes a fixing nip region formed between the fixing roller 21 and the pressing roller 22. Then, the sheet P is ejected from the image forming apparatus 1. After having been ejected from the image forming apparatus 1, the sheet P is stacked as an output image, on the sheet output tray 31, thus completing the image formation process Although the following description relates to the lower sheet feeding device 13 of the sheet feeding devices 12 and 13 in the image forming apparatus 1, the upper sheet feeding device 12 has the same structure as the lower sheet feeding device 13 except their positions. Therefore, a description of the sheet feeding device 12 is omitted.

Figure 2:
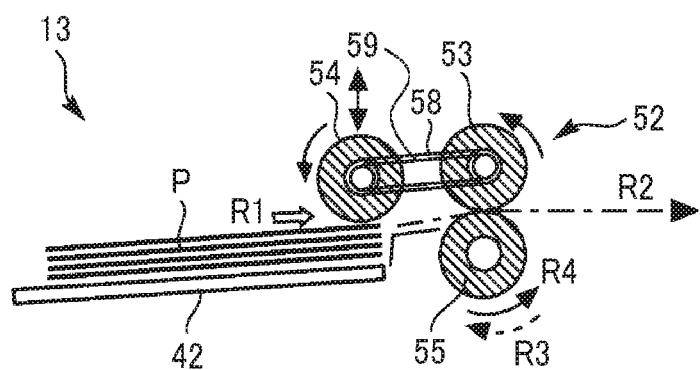
FIG. 2 is a diagram illustrating a sheet feeding device included in the image forming apparatus.

FIG. 2 is a diagram illustrating the sheet feeding device 13 included in the image forming apparatus 1. The sheet feeding device 13 includes the sheet stacker 40 such as the sheet tray designed to load one or more sheets P and the sheet feeding mechanism 52 to feed the sheet P loaded on the sheet stacker 40.

The sheet stacker 40 includes a bottom plate 42 capable of moving up and down, side fences 46 serving as a sheet adjuster movable in a width direction of the sheet P, an end fence 47 serving as the sheet adjuster movable in a feeding direction, which is described later in detail with reference to FIGS. 3 to 6.

As illustrated in FIG. 2, the sheet feeding mechanism 52 includes a feed roller 53, a pickup roller 54, and a separation roller 55.

The feed roller 53 is disposed on the leading end side of the sheet P stacked on the bottom plate 42 of the sheet stacker 40 in the feeding direction that is the direction of arrow R1 in FIG. 2 and is the sheet conveyance direction. The feed roller 53 contacts the upper surface of the sheet P, rotates in the feeding direction of the sheet P, that is, counterclockwise in FIG. 2, and feeds the sheet P in the feeding direction indicated by an arrow R2 in FIG. 2, that is, +X direction.

The pickup roller 54 contacts the upper surface of the sheet P stacked on the sheet stacker 40, rotates in a counterclockwise direction along the feeding direction of the sheet P, and conveys the sheet P toward the feed roller 53.

The timing belt 59 is supported by and entrained around a pulley at the pickup roller 54 and a pulley at the feed roller 53. When a driving force is transmitted from a feed motor to the pickup roller 54 via a gear train, the feed roller 53, and the timing belt 59, the pickup roller 54 rotate counterclockwise in FIG. 2.

The pickup roller 54 is configured to be able to contact and separate from the uppermost sheet P stacked on the sheet stacker 40. That is, the pickup roller 54 is movable between a retracted position at which the pickup roller 54 does not contact the sheet P stacked on the sheet stacker 40 and a contact position at which the pickup roller 54 contacts the sheet P.

Specifically, the pickup roller 54 is rotatably held by the arm 58. The arm 58 is rotatably held by a shaft of the feed roller 53. A spring and a solenoid are connected to the arm 58. The spring urges the pickup roller 54 to move to the retracted position, and the solenoid resists the urging force of the spring to move the pickup roller 54 to the contact position. A controller controls the solenoid to move the pickup roller 54 to the contact position when the solenoid is activated and, when the solenoid is not activated, move the pickup roller 54 to the retracted position.

Even when the pickup roller 54 is moved to the contact position or the retracted position, the timing belt 59 is supported by and entrained around the pulley at the pickup roller 54 and the pulley at the feed roller 53.

The separation roller 55 is disposed to form a nip portion between the separation roller 55 and the feed roller 53.

The separation roller 55 rotates in a forward direction, which is the clockwise direction indicated by dashed arrow R3 in FIG. 2, along the feeding direction when one sheet P is nipped at the nip portion and when the sheet P is not nipped at the nip portion.

By contrast, when a plurality of sheets P is nipped at the nip portion, the separation roller 55 rotates in a direction opposite to the forward direction which is the counterclockwise direction illustrated by solid arrow R4 in FIG. 2. As a result, the rotation of the feed roller 53 feeds the uppermost sheet P among the plurality of sheets P sandwiched at the nip portion, and the rotation of the separation roller 55 moves the lower sheet P among the plurality of sheets P in the direction opposite to the forward direction that is the feeding direction, which prevents multiple feeding of the sheets P.

In the sheet feeding device 13 according to the present embodiment, the bottom plate 42 moves up and down in the vertical direction depending on the number of sheets P stacked on the bottom plate 42 so that the pickup roller 54 can contact the uppermost sheet P stacked in the sheet stacker 40. The feeding operation of the sheet P is performed after the pickup roller 54 descends to the contact position at which the pickup roller 54 contacts the upper surface of the sheet P placed on the bottom plate 42 whose position in the vertical direction is adjusted.

In addition, an inlet guide plate is disposed between the sheet stacker 40 and the nip portion between the feed roller 53 and the separation roller 55.

In the sheet feeding device 13 configured as described above, when the sheet P is not set in the sheet stacker 40, an end-state sensor disposed at a bottom portion detects absence of the sheet P, and the controller controls the solenoid to set the pickup roller 54 at the retracted position.

When the sheet P is set in the sheet stacker 40, the end-state sensor detects presence of the sheet P, and the controller controls the solenoid to move the pickup roller 54 from the retracted position to the contact position illustrated in FIG. 2.

As illustrated in FIG. 2, the pickup roller 54 contacts the upper surface of the uppermost sheet P stacked on the bottom plate 42 and starts to rotate counterclockwise. At the same timing, the feed roller 53 and the separation roller 55 start to rotate. The rotation of the pickup roller 54 feeds the uppermost sheet P in a bundle of sheets stacked in the sheet stacker 40 toward the nip portion between the feed roller 53 and the separation roller 55, and, at the nip portion, the uppermost sheet P is separated as a single sheet P from the remaining sheets P and conveyed to the transfer device 7.

When all sheets P stacked in the sheet stacker 40 are fed and there is no sheet in the sheet stacker 40, the end-state sensor detects the absence of the sheet, and the controller controls the solenoid to move the pickup roller 54 to the retracted position again.

Figure 3:
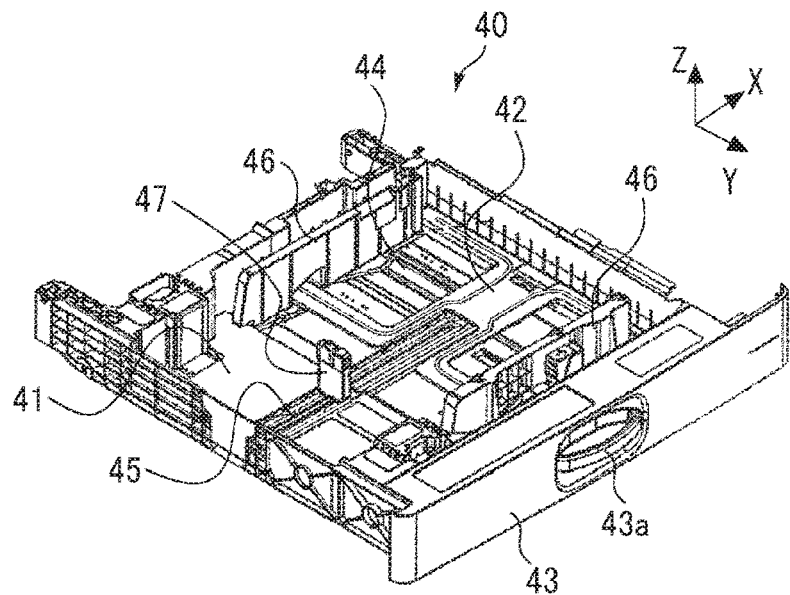
FIG. 3 is a perspective view illustrating a sheet stacker.

As illustrated in FIG. 3, the sheet stacker 40 is a substantially rectangular parallelepiped box-shaped member and includes the bottom plate 42, a first guide rail 44, a second guide rail 45, side fences 46, and an end fence 47 which are disposed on a base 41 and in the box-shaped member.

An exterior cover 43 is set on one of the four sides of the sheet stacker 40. The exterior cover 43 includes a handle 43a. The user grips the handle 43a and inserts and removes the sheet stacker 40 in the ±Y direction in FIG. 3 from the image forming apparatus body. Specifically, the sheet stacker 40 is removed in the +Y direction with respect to the image forming apparatus body, the sheets P are stacked in the sheet stacker 40, and then the sheet stacker 40 is inserted in the −Y direction into the image forming apparatus body.

The bottom plate 42 is configured to move up and down by rotation of the bottom plate 42 in forward and reverse directions around the end position of the rear end side in the feeding direction that is the −X direction in FIG. 3 as the rotation center. A mechanism to move the bottom plate 42 up and down may use a movable plate which is tilted by rotation of motor drive and disposed between the bottom plate 42 and the base 41 or a compression spring which urges or limits urging in conjunction with movement of the sheet stacker 40.

The sheet stacker 40 includes the pair of side fences 46 and the end fence 47 which surround three sides of a space above the bottom plate 42, that is, the space where the sheets P are stacked, which do not surround a leading side in the feeding direction that is +X direction in FIG. 3.

The side fences 46 function as the sheet adjuster to regulate a position in the width direction, which is ±Y direction in FIG. 3, of the sheet P stacked in the sheet stacker 40. The side fences 46 are respectively provided at both end portions in the width direction to sandwich the sheet P, and are movable in the width direction according to the size in the width direction of the sheet P.

The first guide rail 44 extends on the base 41 in the width direction to guide the side fence 46 movably in the width direction. The side fences 46 are manually moved in the width direction along the first guide rail 44 to position the sheet P in the width direction in the sheet stacker 40. As a result, the sheet P whose position in the width direction is fixed is smoothly fed from the sheet stacker 40.

In the present embodiment, the pair of side fences 46 is configured to interlock and increase or decrease the interval in the width direction. That is, when one side fence 46 is manually moved in the +Y direction, the other side fence 46 moves in conjunction with the −Y direction, and when one side fence 46 is manually moved in the −Y direction, the other side fence 46 moves in conjunction with the +Y direction. Such a mechanism to interlock and move the pair of side fences 46 may use a pinion/rack mechanism including a rack gear unit integrally formed so as to extend in the width direction orthogonally to the one side fence 46, another rack gear unit integrally formed so as to extend in the width direction orthogonally to the other side fence 46, and a pinion gear sandwiched between the rack gear units and meshing therewith.

The end fence 47 functions as the sheet adjuster to regulate a rear end position in the feeding direction, which is −X direction in FIG. 3, of the sheet P stacked in the sheet stacker 40. The end fence 47 is provided to contact the rear end of the sheet P in the feeding direction and movable in the feeding direction according to the size in the feeding direction of the sheet P.

The second guide rail 45 extends on the base 41 in the feeding direction to guide the end fence 47 movably in the feeding direction that is ±X direction. The end fence 47 is manually moved in the feeding direction along the second guide rail 45 to position the sheet P in the feeding direction in the sheet stacker 40. As a result, the sheet P whose position in the feeding direction is fixed is smoothly fed from the sheet stacker 40.

With reference to FIGS. 4, 5, and 6A through 6F, an operation portion 48b and a lock 49 serving as an operation restricting member are provided on an upper portion of the end fence 47 serving as a sheet adjuster.

Figure 6A:
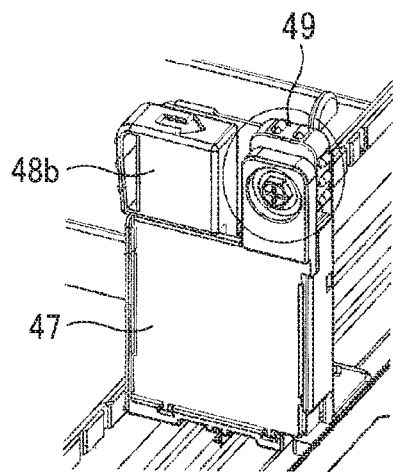
FIGS. 6A to 6F are perspective views illustrating an operation of a lock serving as an operation restricting member in the end fence.
Figure 6B:
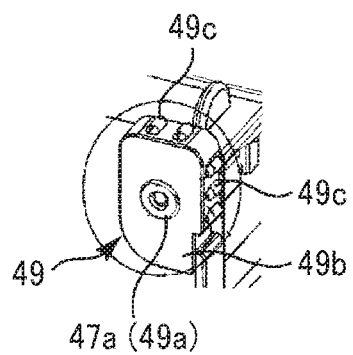
Figure 6C:
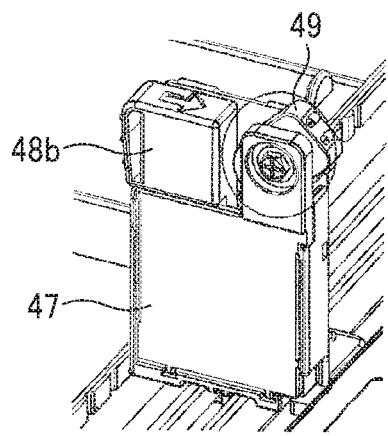
Figure 6D:
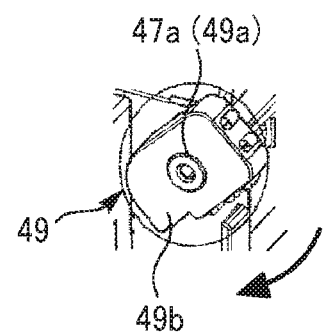
Figure 6E:
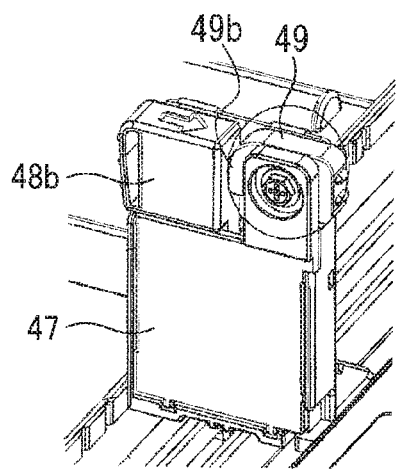
Figure 6F:
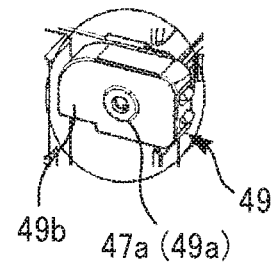

FIGS. 6A, 6C, and 6E are external views illustrating a pivoting operation of the lock 49 serving as the operation restricting member. FIGS. 6B, 6D, and 6F are internal views of a main part corresponding to FIGS. 6A, 6C, and 6E, respectively.

Figure 4:
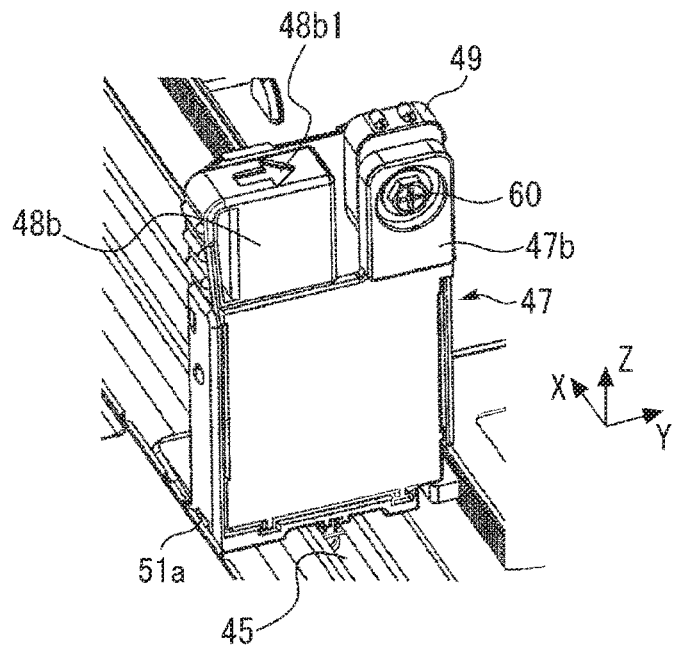
FIG. 4 is an enlarged perspective view illustrating an end fence serving as a sheet adjuster.

The operation portion 48b is moved in a predetermined direction that is the +Y direction in FIG. 4 to release the end fence 47 serving as the sheet adjuster whose position is fixed. That is, the operation portion 48b is manually operated and moved in the +Y direction, which changes the end fence 47 from a fixed state to a released state that enables the end fence 47 to change the position in the ±X direction that is the feeding direction. After the position of the end fence 47 in the ±X direction is fixed, the operation portion 48b is not operated. Each time the sheet P having a different size is set in the sheet stacker 40, the operation portion 48b is operated to change the position of the end fence 47.

Figure 5:
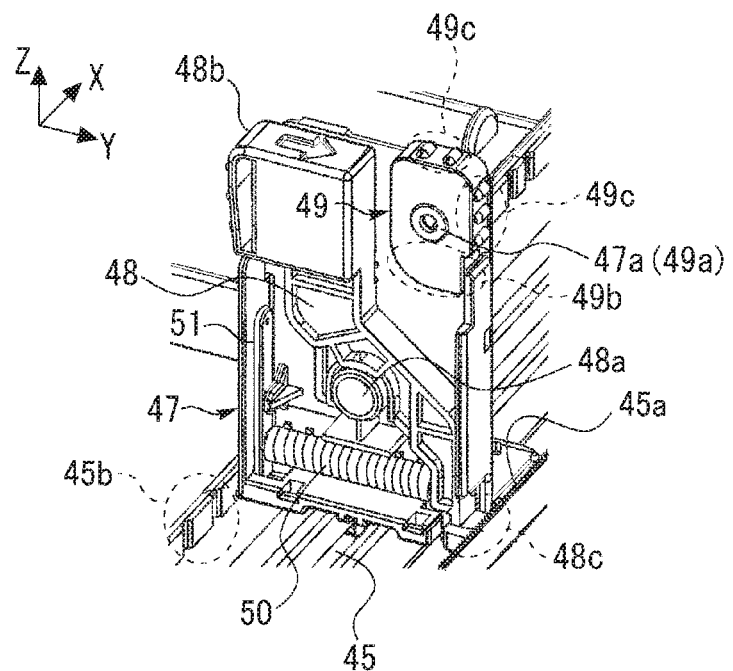
FIG. 5 is a perspective view illustrating an interior of the end fence.

Specifically, as illustrated in FIG. 5, the second guide rail 45 that movably guides the end fence 47 serving as the sheet adjuster includes a wall portion to sandwich the lower portion of the end fence 47 in the Y direction. The wall portion includes a concave portion 45b in one side of the wall portion and a slit 45a in the other side of the wall portion.

The concave portion 45b formed in the one side of the wall portion determines the rear end position of the sheet P having a standard size (A size, such as A4 and A3, or B size, such as B4 and B3) in the feeding direction because an exposed latch claw 51a of the end fence 47, which is illustrated in FIG. 4, engages the concave portion 45b. The latch claw is formed on the tip of an arm 51 illustrated in FIG. 5. The arm 51 is elastically and deformably supported in the end fence 47.

Regarding the engagement between the concave portion 45b and the latch claw 51a, the shape of the concave portion 45b and the latch claw 51a and the elastic force of the arm 51 are designed such that a moderate and reliable click feeling can be obtained when the user manually moves the end fence 47 in the ±X direction, and applying a force of an appropriate magnitude can release the engagement between the concave portion 45b and the latch claw 51a.

As illustrated in FIG. 5, the slit 45a of the second guide rail 45 extends along the ±X direction that is a direction of movement of the end fence 47 in the other side of the wall portion.

On the other hand, in the end fence 47, a pivot member 48 is supported to be rotatable around a support shaft 48a that stands toward the −X direction. The pivot member 48 includes the operation portion 48b and a pawl portion 48c. The pawl portion 48c is a latch pawl that fits the slit 45a on a side opposite the operation portion 48b seen from the support shaft 48a.

In addition, the end fence 47 includes a compression spring 50 serving as an urging member that urges the pivot member 48 so that the pawl portion 48c of the pivot member 48 fits the slit 45a. One end of the compression spring 50 serving as the urging member is coupled to an inner wall of the end fence 47, and the other end of the compression spring 50 is coupled to a bottom portion of the pivot member 48. The compression spring 50 urges the pivot member 48 so that the operation portion 48b moves in the −Y direction.

In such a structure, as illustrated in FIG. 5, when the operation portion 48b is not operated, an urging force of the compression spring 50 pivots the pivot member 48 counterclockwise in a Y-Z plane of FIG. 5. As a result, the pawl portion 48c fits the slit 45a. This restricts and fixes the position of the end fence 47 in the ±X direction and positions the end fence 47. Therefore, even when the user sets the sheet P having an irregular size which is not the standard size or the sheet P having a minute dimensional error from the standard size due to a cutting error or the like in the sheet stacker 40, the user can freely fix and position the end fence 47 at a position suitable for the size of the sheet P and may not position the end fence 47 at the position of the concave portion 45b for the standard size.

When the user moves the operation portion 48b in the +Y direction, the pivot member 48 resists the urging force of the compression spring 50 and is pivoted in the clockwise direction in the Y-Z plane of FIG. 5, which releases the engagement between the pawl portion 48c and the slit 45a. This releases the fixed state of the end fence 47 and enables a manual movement of the end fence 47 in the ±X direction, that is, sets the end fence 47 in the released state. In the present embodiment, a mark 48b1 that is an arrow indicating the +Y direction is formed at the top of the operation portion 48b, which supports the user's operation of the operation portion 48b.

When the latch claw 51a is engaged with the concave portion 45b for the standard size of the sheet P, the pawl portion 48c of the pivot member 48 is fitted to the slit 45a. Therefore, when the end fence 47 is moved in the ±X direction in the above-described state, a same operation for the operation portion 48b releases the fixed state of the end fence 47.

On the other hand, the lock 49 serving as the operation restricting member is movable in the ±X direction together with the end fence 47 and the operation portion 48b and which regulates and locks the operation of the operation portion 48b in a predetermined direction that is, for example, the +Y direction. That is, the lock 49 functions as a stopper so that the operation portion 48b is not moved in the +Y direction in the fixed state of the end fence 47. After the end fence 47 is positioned in the ±X direction, the lock 49 restricts the movement of the operation portion 48b in the +Y direction.

Specifically, as illustrated in FIGS. 4, 5, 6A, and 6B, the lock 49 serving as the operation restricting member is configured to move between a first position that is a lock release position in which the lock 49 does not contact the operation portion 48b and a second position that is a locked position in which the lock 49 contacts the operation portion 48b.

More specifically, as illustrated in FIG. 5, the lock 49 serving as the operation restricting member is rotatably supported on the end fence 47 around a boss 47a as a pivot shaft so that the lock 49 is opposed to the front end of the operation portion 48b in the predetermined direction that is +Y direction in FIG. 5. The boss 47a stands on the end fence 47 in the −X direction. The boss 47a is inserted into a through-hole 49a of the lock 49, and a screw 60 is screwed into internal threads of the boss 47a such that a branch 47b of the end fence 47 intervenes between the screw 60 and the boss 47a. As illustrated in FIGS. 6A to 6F, this structure enables the lock 49 on the end fence 47 to be rotatable about the boss 47a.

The lock 49 allows an operation of the operation portion 48b that moves the operation portion 48b in the predetermined direction that is +Y direction when the lock 49 is set in a first position that is a lock release position illustrated in FIGS. 6A and 6B and prohibits the operation when the lock 49 is set in a second position that is a lock position illustrated in FIGS. 6E and 6F.

Specifically, with reference to FIGS. 5 and 6A to 6F, the lock 49 includes a projection 49b to which a length from the boss 47a serving as the pivot shaft is longer than lengths from the boss 47a to other parts of the lock 49.

As illustrated in FIGS. 6A and 6B, when a posture of the lock 49 in a pivoting direction is set so that the projection 49b gets away from the operation portion 48b, a clearance between the operation portion 48b and the lock 49 is enough for the operation portion 48b to move in the +Y direction. That is, the end fence 47 becomes the released state that is a lock released state which enables the end fence 47 to move in the ±X direction.

After the end fence 47 is positioned in the ±X direction, the pivot member 48 is pivoted in an arrow direction of FIG. 6D and changes the state illustrated in FIGS. 6A and 6B to a state illustrated in FIGS. 6C and 6D. As illustrated in FIGS. 6E and 6F, when the posture of the lock 49 in the pivoting direction is set so that the projection 49b is opposite to the operation portion 48b, there is no clearance between the operation portion 48b and the lock 49 to move the operation portion 48b in the +Y direction. That is, the end fence 47 becomes the fixed state that is a lock state in which the end fence 47 is immovable in the ±X direction.

When the lock 49 is switched from the lock state to the lock released state, the lock 49 is operated and pivoted from the state illustrated in FIGS. 6E and 6F to the state illustrated in FIGS. 6A and 6B via the state illustrated in FIGS. 6C and 6D counterclockwise.

As described above, in the present embodiment, after the end fence 47 is positioned in the ±X direction, the lock 49 is operated and pivoted to the state illustrated in FIGS. 6E and 6F to restrict the movement of the operation portion 48b in the +Y direction. This appropriately positions the end fence 47 to set the position of the sheet P and prevents a disadvantage due to misalignment of the end fence 47 from the appropriate position caused by user's operation error such as an error when the user accidentally moves the operation portion 48b. The present embodiment, without attaching and detaching a member, provides easy and hassle-free operation involving pivoting the lock 49 disposed on the end fence 47, which is the lock operation and the lock release operation, switches the end fence 47 from the fixed state to the fixed release state, or from the fixed release state to the fixed state. The lock 49 integrated with the end fence 47 prevents the lock 49 from dropping off or otherwise getting lost.

As illustrated in FIG. 5, in the present embodiment, the lock 49 serving as the operation restricting member includes a plurality of protrusions 49c serving as an operation limiting member on the outer peripheral surface of the lock 49 in the direction of movement that is the pivoting direction. Specifically, as illustrated in FIG. 5, when the lock 49 is in the lock release position, the plurality of protrusions 49c are on the side surface in the +Y direction and the upper surface of the lock 49.

This structure enables the user to easily turn the lock 49 by putting the user's finger on the protrusions 49c.

In this embodiment, the plurality of protrusions 49c is provided on the lock 49. However, instead of the plurality of protrusions 49c, a plurality of recesses on the lock 49 also have the same effect.

<Variation>

Figure 7:
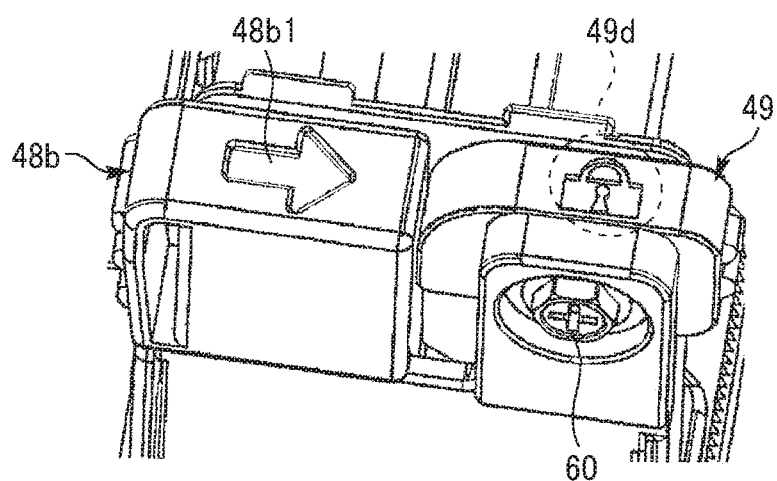
FIG. 7 is an enlarged perspective view illustrating a top portion of the end fence as a variation.

FIG. 7 is an enlarged perspective view illustrating a top portion of the end fence as a variation.

As illustrated in FIG. 7, in the present embodiment, the lock 49 serving as the operation restricting member includes another mark 49d on the outer peripheral surface of the lock 49 to indicate that the lock 49 is in the second position that is the lock position. Specifically, another mark 49d marking a padlock as a key is printed on the upper surface of the lock 49 positioned at the second position as the lock position. The upper surface is a position visually recognized by the user. By another mark 49d, the user can visually recognize that the lock 49 is at the second position, which supports the user's turning operation.

In the present variation, the lock 49 includes another mark 49d indicating that the lock 49 is at the second position as the lock position. However, the lock 49 may include a mark indicating that the lock 49 is at the first position as the lock release position, or both marks may be included.

As described above, the sheet stacker 40 of the present embodiment includes the end fence 47 serving as the sheet adjuster that is movable to regulate the position of the sheet P, the operation portion 48b that changes the end fence 47 from the fixed state to the released state when the operation portion 48b is moved in the predetermined direction, and the lock 49 serving as the operation restricting member movable together with the end fence 47 and the operation portion 48b to regulate and lock the operation of the operation portion 48b in the predetermined direction.

This uncomplicated structure enables the end fence 47 to freely fix and release at the appropriate positions and prevents a disadvantage due to misalignment of the end fence 47 from the appropriate position caused by user's operation error.

It is to be noted that the present embodiment of this disclosure is applied to the sheet stacker 40 provided to the image forming apparatus 1 that performs monochrome image formation. However, this disclosure is not limited thereto. For example, this disclosure can also be applied to a sheet tray serving as the sheet stacker provided to an image forming apparatus that performs color image formation.

Further, it is to be noted that the present embodiment of this disclosure is applied to the sheet stacker 40 provided to the image forming apparatus 1 that employs electrophotography. However, this disclosure is not limited thereto. For example, this disclosure can also be applied to a sheet stacker provided to an image forming apparatus that employs an inkjet method or a stencil printing machine.

Further, it is to be noted that the present embodiment of this disclosure is applied to the sheet stacker 40 such as the sheet tray in the sheet feeding device 13 located in the image forming apparatus 1. However, this disclosure is not limited thereto. For example, this disclosure can be applied to the manual sheet feeding tray serving as the sheet stacker in the manual sheet feeding device 16 for the manual sheet feeding tray disposed outside the image forming apparatus 1. Further, this disclosure can also be applied to the document tray serving as the sheet stacker in the document conveying device 10 (the automatic document feeder) as the sheet feeding device.

In such configurations, effects similar to those described above are also attained.

Further, the present embodiment of this disclosure is applied to the end fence 47 serving as the sheet adjuster including the operation portion 48b and the lock 49 serving as the operation restricting member. However, this disclosure is not limited thereto. For example, this disclosure can be applied to the side fence 46 as a sheet adjuster including the operation portion and the operation restricting member.

Further, the present embodiment includes the structure in which a pivoting operation of the lock 49 serving as the operation restricting member configured to be rotatable around the rotation axis moves the lock 49 serving as the operation restriction member between the first position that is the lock release position and the second position that is the lock position. Another structure may be adopted in which a sliding operation of the lock 49 serving as the operation restricting member configured to be slidable in the ±Y direction, ±X direction or ±Z direction moves the lock 49 serving as the operation restriction member between the first position that is the lock release position and the second position that is the lock position.

In such configurations, effects similar to those described above are also attained.

The present disclosure is not limited to the above-described embodiments, and the configuration of the present embodiment can be appropriately modified other than suggested in each of the above embodiments within a scope of the technological concept of the present disclosure. Also, the positions, the shapes, and the number of components are not limited to the embodiments, and they may be modified suitably in implementing the present disclosure.

It is to be noted that, as described above, a "sheet" in the above-described embodiments of this disclosure is not limited to indicate regular paper but also includes any other sheet-like material such as coated paper, label paper, an OHP film sheet, a metal film, a film, prepreg, a cloth.

What is claimed is:

1. A sheet stacker comprising:
a sheet adjuster movable to regulate a position of a sheet in the sheet stacker;
an operation portion to fix or release the sheet adjuster with respect to the sheet stacker upon the operation portion moving in a first direction; and
a lock, disposed in the sheet adjuster and movable together with the sheet adjuster and the operation portion, to regulate a release operation of the operation portion in the first direction, orthogonal to a moving direction of the sheet adjuster,
the operation portion, being configured to release fixation of a side fence, and the lock, being further configured to regulate operation of the operation portion, being disposed at a same position, in a height direction of the side fence,
wherein the lock is configured to move between a first position, at which the lock does not contact the operation portion, and a second position, at which the lock contacts the operation portion; and
wherein the lock at the first position is configured to allow movement of the operation portion in the first direction, and wherein the lock, at the second position, is configured to inhibit the movement of the operation portion in the first direction.

2. The sheet stacker of claim 1,
wherein the lock includes at least one of a protrusion from an outer peripheral surface of the lock and a recess in the outer peripheral surface of the lock, along a direction of movement of the lock.

3. The sheet stacker of claim 1,
wherein the lock includes a mark on an outer peripheral surface of the lock, the mark indicating a position of the lock, and the position being at least one of the first position and the second position.

4. The sheet stacker of claim 1,
wherein the operation portion and the lock are disposed in an upper portion of the sheet adjuster.

5. An image forming apparatus comprising the sheet stacker of claim 1.

6. The sheet stacker of claim 1, wherein the lock is configured to regulate only an operation of the operation portion.

7. An image forming apparatus comprising the sheet stacker of claim 6.

8. The sheet stacker of claim 1, wherein the sheet adjuster is an end fence.

9. An image forming apparatus comprising the sheet stacker of claim 8.

10. The sheet stacker of claim 1, further comprising:
a guide rail to guide the sheet adjuster, the guide rail including a slit extending along a direction of movement of the sheet adjuster;
a support shaft disposed on the sheet adjuster;
a pivot member, being pivotable around the support shaft and supported by the support shaft, the pivot member including the operation portion and a pawl portion, configured to fit the slit on a side opposite the operation portion, with respect to the support shaft;
an urging member to urge the pivot member and to cause the pawl portion to fit into the slit; and
a pivot shaft disposed on the sheet adjuster and supporting the lock,
wherein the lock is rotatable around the pivot shaft and opposed to a front end of the operation portion in the first direction.

11. A sheet stacker, comprising:
a sheet adjuster movable to regulate a position of a sheet in the sheet stacker;
an operation portion to release the sheet adjuster upon the operation portion moving in a first direction;
a lock, movable together with the sheet adjuster and the operation portion, to regulate a movement of the operation portion in the first direction;
a guide rail to guide the sheet adjuster, the guide rail including a slit extending along a direction of movement of the sheet adjuster;
a support shaft disposed on the sheet adjuster;
a pivot member, being pivotable around the support shaft and supported by the support shaft, the pivot member including the operation portion and a pawl portion, configured to fit the slit on a side opposite the operation portion, with respect to the support shaft;
an urging member to urge the pivot member and to cause the pawl portion to fit into the slit; and
a pivot shaft disposed on the sheet adjuster and supporting the lock,
wherein the lock is rotatable around the pivot shaft and opposed to a front end of the operation portion in the first direction.

12. An image forming apparatus comprising the sheet stacker of claim 11.

13. The sheet stacker of claim 11, wherein the lock is configured to regulate only an operation of the operation portion.

14. The sheet stacker of claim 11, wherein the sheet adjuster is an end fence.

15. The sheet stacker of claim 14, further comprising a second guide rail to movably guides the end fence.

* * * * *